United States Patent
Chow et al.

(10) Patent No.: US 7,124,983 B2
(45) Date of Patent: Oct. 24, 2006

(54) HYBRID ELECTRICAL ICE PROTECTION SYSTEM AND METHOD INCLUDING AN ENERGY SAVING MODE

(75) Inventors: Philip S. Chow, Gilbert, AZ (US); Jean-Luc Derouineau, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 95 days.

(21) Appl. No.: 11/042,764

(22) Filed: Jan. 24, 2005

(65) Prior Publication Data
US 2006/0196994 A1   Sep. 7, 2006

Related U.S. Application Data

(60) Provisional application No. 60/603,429, filed on Aug. 20, 2004.

(51) Int. Cl.
*B64D 15/12* (2006.01)
(52) U.S. Cl. ............... 244/134 D; 244/134 R
(58) Field of Classification Search ............ 244/134 R, 244/134 A, 134 B, 134 C, 134 D, 134 E, 244/234 F; 343/704–708; 192/62; 191/62
See application file for complete search history.

(56) References Cited

U.S. PATENT DOCUMENTS

| | | | | | |
|---|---|---|---|---|---|
| 2,297,540 | A | * | 9/1942 | Driscoll ................ | 244/134 D |
| 2,558,493 | A | * | 6/1951 | Melot ..................... | 244/134 R |
| 2,590,944 | A | * | 4/1952 | Cowdrey et al. ........ | 244/134 D |
| 2,599,059 | A | * | 6/1952 | Jones ..................... | 244/134 D |
| 2,627,012 | A | * | 1/1953 | Kinsella et al. ......... | 244/134 R |
| 2,686,640 | A | * | 8/1954 | Neel, Jr. et al. ......... | 244/134 D |
| 2,757,273 | A | * | 7/1956 | Taylor ..................... | 219/537 |
| 2,791,668 | A | * | 5/1957 | Cowdrey et al. ........ | 219/528 |
| 2,878,357 | A | * | 3/1959 | Thomson et al. ........ | 338/292 |
| 2,932,719 | A | * | 4/1960 | Gooden .................. | 219/545 |
| 2,938,992 | A | * | 5/1960 | Crump .................... | 219/528 |
| 2,992,317 | A | * | 7/1961 | Hoffman ................. | 219/202 |
| 3,022,412 | A | * | 2/1962 | Waters ..................... | 219/549 |
| 3,204,084 | A | * | 8/1965 | Spencer, Jr. et al. ..... | 219/202 |
| 3,420,476 | A | * | 1/1969 | Schultz et al. ........... | 244/134 D |
| 3,569,656 | A | * | 3/1971 | White et al. .............. | 219/685 |
| 3,657,514 | A | * | 4/1972 | Adams .................... | 219/201 |
| 3,982,092 | A | * | 9/1976 | Marriott ................... | 219/203 |
| 4,036,457 | A | * | 7/1977 | Volkner et al. ........... | 244/134 D |
| 4,078,107 | A | * | 3/1978 | Bitterice et al. .......... | 428/38 |
| 4,365,131 | A | * | 12/1982 | Hansman, Jr. ............ | 219/703 |
| 4,386,749 | A | * | 6/1983 | Sweet et al. .............. | 244/134 D |
| 4,410,794 | A | * | 10/1983 | Williams .................. | 219/486 |
| 4,514,619 | A | * | 4/1985 | Kugelman ................ | 219/483 |
| 4,561,613 | A | * | 12/1985 | Weisend, Jr. ............. | 244/134 A |
| 4,766,369 | A | * | 8/1988 | Weinstein ................. | 324/670 |
| 5,074,497 | A | * | 12/1991 | Phillips, II ............... | 244/134 D |
| 5,114,100 | A | | 5/1992 | Rudolph et al. | |
| 5,143,325 | A | * | 9/1992 | Zieve et al. .............. | 244/134 D |
| 5,152,480 | A | * | 10/1992 | Adams et al. ............ | 244/134 D |
| 5,160,102 | A | * | 11/1992 | Hlavac .................... | 244/134 A |
| 5,322,246 | A | | 6/1994 | Henne et al. | |

(Continued)

*Primary Examiner*—Teri Pham Luu
*Assistant Examiner*—S. A. Holzen
(74) *Attorney, Agent, or Firm*—Ingrassia Fisher & Lorenz

(57) ABSTRACT

A hybrid electrical ice protection system implements three ice protection methods in various combinations. The ice protection methods include the fully-evaporative anti-ice protection method, the wet running anti-ice protection method, and the de-ice method. The particular methods that are implemented vary, depending on the particular aircraft structure for which ice protection is being provided and on the power condition of the aircraft.

30 Claims, 5 Drawing Sheets

U.S. PATENT DOCUMENTS

| | | | | |
|---|---|---|---|---|
| 5,326,051 A * | 7/1994 | Pisarski | | 244/134 D |
| 5,346,160 A * | 9/1994 | Pisarski | | 244/134 R |
| 5,351,918 A * | 10/1994 | Giamati et al. | | 244/134 D |
| 5,356,096 A * | 10/1994 | Rauckhorst et al. | | 244/134 A |
| 5,474,261 A * | 12/1995 | Stolarczyk et al. | | 244/134 F |
| 5,475,204 A * | 12/1995 | Giamati et al. | | 219/548 |
| 5,489,073 A * | 2/1996 | Leffel et al. | | 244/134 R |
| 5,531,405 A * | 7/1996 | Goldberg | | 244/134 B |
| 5,547,150 A * | 8/1996 | Adams et al. | | 244/134 R |
| 5,553,815 A * | 9/1996 | Adams et al. | | 244/134 R |
| 5,584,450 A * | 12/1996 | Pisarski | | 244/134 D |
| 5,609,314 A * | 3/1997 | Rauckhorst et al. | | 244/134 A |
| 5,657,951 A * | 8/1997 | Giamati | | 244/134 D |
| 5,686,003 A * | 11/1997 | Ingram et al. | | 219/201 |
| 5,845,878 A * | 12/1998 | Rauckhorst et al. | | 244/134 A |
| 5,904,322 A * | 5/1999 | Giamati et al. | | 244/134 B |
| 5,921,502 A | 7/1999 | Al-Khalil et al. | | |
| 5,947,418 A * | 9/1999 | Bessiere et al. | | 244/134 D |
| 5,971,323 A * | 10/1999 | Rauch et al. | | 244/134 D |
| 6,102,333 A | 8/2000 | Gerardi et al. | | |
| 6,129,314 A * | 10/2000 | Giamati et al. | | 244/134 R |
| 6,145,787 A * | 11/2000 | Rolls | | 244/134 R |
| 6,196,500 B1 * | 3/2001 | Al-Khalil et al. | | 244/134 R |
| 6,207,940 B1 * | 3/2001 | Feher et al. | | 219/679 |
| 6,227,492 B1 * | 5/2001 | Schellhase et al. | | 244/134 D |
| 6,237,874 B1 * | 5/2001 | Rutherford et al. | | 244/134 E |
| 6,283,411 B1 | 9/2001 | Giamati et al. | | |
| 6,338,455 B1 * | 1/2002 | Rauch et al. | | 244/134 D |
| 6,352,601 B1 * | 3/2002 | Ray | | 156/71 |
| 6,402,093 B1 * | 6/2002 | Wang | | 244/134 R |
| RE38,024 E * | 3/2003 | Adams et al. | | 244/134 D |
| 6,787,744 B1 * | 9/2004 | Feher et al. | | 219/679 |
| 6,847,024 B1 * | 1/2005 | Petrenko | | 219/770 |
| 6,906,537 B1 * | 6/2005 | Goldberg et al. | | 324/721 |
| 7,034,257 B1 * | 4/2006 | Petrenko | | 219/482 |
| 2003/0155467 A1 * | 8/2003 | Petrenko | | 244/134 R |
| 2004/0217106 A1 * | 11/2004 | Giterman | | 219/486 |
| 2004/0245395 A1 * | 12/2004 | Wallace | | 244/134 R |
| 2005/0006529 A1 * | 1/2005 | Moe et al. | | 244/134 D |
| 2005/0035110 A1 * | 2/2005 | Petrenko | | 219/482 |
| 2005/0067532 A1 * | 3/2005 | Hindel et al. | | 244/134 D |
| 2005/0242233 A1 * | 11/2005 | Battisti | | 244/58 |
| 2005/0263646 A1 * | 12/2005 | Nichols | | 244/134 F |
| 2005/0288895 A1 * | 12/2005 | Petit | | 702/182 |

* cited by examiner

HYBRID ELECTRICAL ICE PROTECTION SYSTEM AND METHOD INCLUDING AN ENERGY SAVING MODE

CROSS-REFERENCES TO RELATED APPLICATIONS

This application claims the benefit of U.S. Provisional Application No. 60/603,429, filed Aug. 20, 2004.

TECHNICAL FIELD

The present invention relates to aircraft ice protection and, more particularly, to a hybrid electrical aircraft ice protection system and method that includes an energy saving mode.

BACKGROUND

When an aircraft is flown during certain atmospheric conditions, ice can form and potentially accumulate on one or more of its exterior surfaces. Such ice formation and accumulation can result from, for example, impingement of atmospheric water droplets. The formation and accumulation of ice can have certain adverse and/or deleterious effects on aircraft performance.

For example, following its formation on an exterior surface, ice can break loose and enter the aircraft engines, or collide with protruding surfaces such as antennas, wings, moveable control surfaces, or various structures on the ground. Ice accumulation on airfoil surfaces such as wings and empennages can also adversely affect airfoil aerodynamic performance. In addition, the weight of any accumulated ice may change the overall weight and/or center of gravity of the aircraft. Moreover, ice accumulation on moveable surfaces may interfere with the operation of the moveable surface. Consequently, many aircraft include an ice protection system that either prevents the formation of ice on aircraft surfaces or removes ice that forms on such surfaces.

An aircraft ice protection system is typically configured to implement one, or perhaps two, types of ice protection methods. The ice protection methods that may be implemented are generally categorized as either anti-ice methods or de-ice methods. Anti-icing methods typically prevent ice formation on aircraft surfaces altogether, whereas de-ice methods typically allow ice to form on aircraft surfaces and periodically removes the formed ice.

Generally, there are two known anti-ice methods that may be implemented by an aircraft ice protection system. These anti-ice methods include the fully-evaporative method and the wet running method. The fully-evaporative anti-ice method fully evaporates all impinging water by heating the aircraft structure to a relatively high temperature. With the wet running method, ice formation is prevented by heating, or applying freezing point depressants to, the areas where the water is impinging. The impinging water is not evaporated, but instead runs downstream of the impinging area.

As regards de-icing methods, there are generally three different types, thermal, chemical, and mechanical. The thermal de-ice method uses thermal energy to raise the temperature of the surface, either electrically or by hot engine bleed air. The chemical de-ice method is implemented by applying a chemical freezing point depressant to the ice through pores in the structure. The formed ice then turns to slush and is swept away by the airstream. The mechanical de-ice method is typically implemented by using one or more devices to deform the exterior surface of the structure to break up the ice and allow it to be swept away by the airstream.

Although the above-described anti-ice and de-ice methods are generally safe, reliable, and robust, each suffers certain drawbacks. For example, the fully-evaporative anti-ice method requires a significant amount of thermal energy to implement. While the running wet anti-ice method requires less thermal energy than the fully-evaporative method, the amount of energy may still be significant. As regards the de-ice methods, although each of the above-described de-ice methods may require less energy to implement than either of the two anti-ice methods, the use of only a de-ice method on an aircraft is typically not implemented. Rather, a de-ice method, if implemented, is typically done so in combination with either the fully-evaporative anti-ice method or the wet running anti-ice method. This is typically done because, for example, ice formation on the some of the aircraft surfaces may adversely impact flight performance, and ice that is removed from an engine nacelle may be ingested into the engine, which can have deleterious effects.

In view of the foregoing, it may be seen that currently known aircraft ice protection systems typically use a relatively significant amount of energy. Moreover, as may be appreciated, the aircraft ice protection system is typically treated as a system that is required to be available throughout the flight of an aircraft. As such, even if the aircraft were to experience a highly unlikely event that resulted in the aircraft being able to supply less than full electrical power to its electrical loads, the aircraft ice protection system may still need to be operated at full capability.

Hence, there is a need for an aircraft ice protection system and method that can implement an adequate level of ice protection for an aircraft even if the aircraft were to experience a highly unlikely event that resulted in the aircraft being unable to supply full electrical power. The present invention addresses at least this need.

BRIEF SUMMARY

The present invention provides a hybrid ice protection system and method that implements an adequate level of ice protection for an aircraft even if the aircraft experiences a highly unlikely event that results in the aircraft being unable to supply full electrical power.

In one embodiment, and by way of example only, an electrical ice protection system for an aircraft that includes a structure having at least an outer skin, and is operable in at least a nominal power condition and an off-nominal power condition includes a plurality of electrical heaters, and a controller. The plurality of electrical heaters are disposed at least proximate the aircraft structure outer skin and are configured to heat at least a portion of the aircraft structure outer skin upon energization thereof. The plurality of electrical heaters includes at least a first set of heaters and a second set of heaters. The controller is configured to determine whether the aircraft is in the nominal power condition or the off-nominal power condition. The controller is coupled to each of the electrical heaters and is further configured, in response to the determined power condition, to selectively energize the first set of heaters in a manner that the first set of heaters are operated in a fully-evaporative anti-ice mode, and selectively energize the second set of heaters in a manner that the second set of heaters are operated in (i) a wet running anti-ice mode, if the aircraft is in the nominal power condition, and (ii) de-ice mode, if the aircraft is in the off-nominal power condition.

In another exemplary embodiment, an electrical ice protection system for an aircraft that includes an engine nacelle having at least an inboard surface and an adjacent outboard surface, each including an outer skin, and that is operable in at least a nominal power condition and an off-nominal power condition, includes a first set of electrical heaters, a second set of electrical heaters, and a controller. The first set of electrical heaters are disposed proximate the engine nacelle inboard surface outer skin and are configured, upon energization thereof, to heat at least a portion of the engine nacelle inboard surface outer skin. The second set of electrical heaters are disposed proximate the engine nacelle outboard surface outer skin and are configured, upon energization thereof, to heat at least a portion of the engine nacelle outboard surface outer skin. The controller is configured to determine whether the aircraft is in the nominal power condition or the off-nominal power condition, and is coupled to the first and second set of electrical heaters. The controller is further configured, in response to the determined power condition, to selectively energize the first set of electrical heaters in a manner that the first set of heaters are operated in a fully-evaporative anti-ice mode, and selectively energize the second set of electrical heaters in a manner that the second set of electrical heaters are operated in (i) a wet running anti-ice mode, if the aircraft is in the nominal power condition, and (ii) a de-ice mode, if the aircraft is in the off-nominal power condition.

In still another exemplary embodiment, an electrical ice protection system for an aircraft that includes a wing having at least an upper surface and a lower surface, and is operable in at least a nominal power condition and an off-nominal power condition, includes a first set of electrical heaters, a second set of electrical heaters, and a controller. The first set of electrical heaters are disposed proximate the wing upper surface outer skin, and are configured, upon energization thereof, to heat at least a portion of the wing upper surface outer skin. The second set of electrical heaters are disposed proximate the wing lower surface outer skin, and are configured, upon energization thereof, to heat at least a portion of the wing lower surface outer skin. The controller is configured to determine whether the aircraft is in the nominal power condition or the off-nominal power condition, and is coupled to the first and second set of electrical heaters. The controller is further configured, in response to the determined power condition, to selectively energize the first set of electrical heaters in a manner that the first set of heaters are operated in a fully-evaporative anti-ice mode, and selectively energize the second set of electrical heaters in a manner that the second set of electrical heaters are operated in (i) a wet running anti-ice mode, if the aircraft is in the nominal power condition, and (ii) a de-ice mode, if the aircraft is in the off-nominal power condition.

In yet a further exemplary embodiment, an electrical ice protection system for an aircraft that includes an engine nacelle and an aircraft wing, in which the engine nacelle has at least an inboard surface and an adjacent outboard surface, each with an outer skin, and the aircraft wing has at least an upper surface and a lower surface, each with an outer skin, and is operable in at least a nominal power condition and an off-nominal power condition, includes a first set of electrical heaters, a second set of electrical heaters, a third set of electrical heaters, a fourth set of electrical heaters, and a controller. The first set of electrical heaters are disposed proximate the engine nacelle inboard surface outer skin, and are configured, upon energization thereof, to heat at least a portion of the engine nacelle inboard surface outer skin. The second set of electrical heaters are disposed proximate the engine nacelle outboard surface outer skin, and are configured, upon energization thereof, to heat at least a portion of the engine nacelle outboard surface outer skin. The third set of electrical heaters are disposed proximate the aircraft wing upper surface outer skin, and are configured, upon energization thereof, to heat at least a portion of the wing upper surface outer skin. The fourth set of electrical heaters are disposed proximate the aircraft wing lower surface outer skin, and are configured, upon energization thereof, to heat at least a portion of the wing lower surface outer skin. The controller is configured to determine whether the aircraft is in the nominal power condition or the off-nominal power condition, and is coupled to the first, second, third, and fourth sets of electrical heaters. The controller is further configured, in response to the determined power condition, to selectively energize the first and third sets of electrical heaters in a manner that the first and third sets of electrical heaters are operated in a fully-evaporative anti-ice mode, and selectively energize the second and fourth sets of electrical heaters in a manner that the second and fourth sets of electrical heaters are operated in (i) a wet running anti-ice mode, if the aircraft is in the nominal power condition, and (ii) a de-ice mode, if the aircraft is in the off-nominal power condition.

In yet still a further exemplary embodiment, a method of implementing ice protection for an aircraft that is operable in at least a nominal power condition and an off-nominal power condition includes operating a first set of heaters in a fully-evaporative anti-ice mode. A second set of heaters is operated in a wet running anti-ice mode when the aircraft is in the nominal power condition, and in a de-ice mode when the aircraft is in the off-nominal power condition.

Other independent features and advantages of the preferred ice protection system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
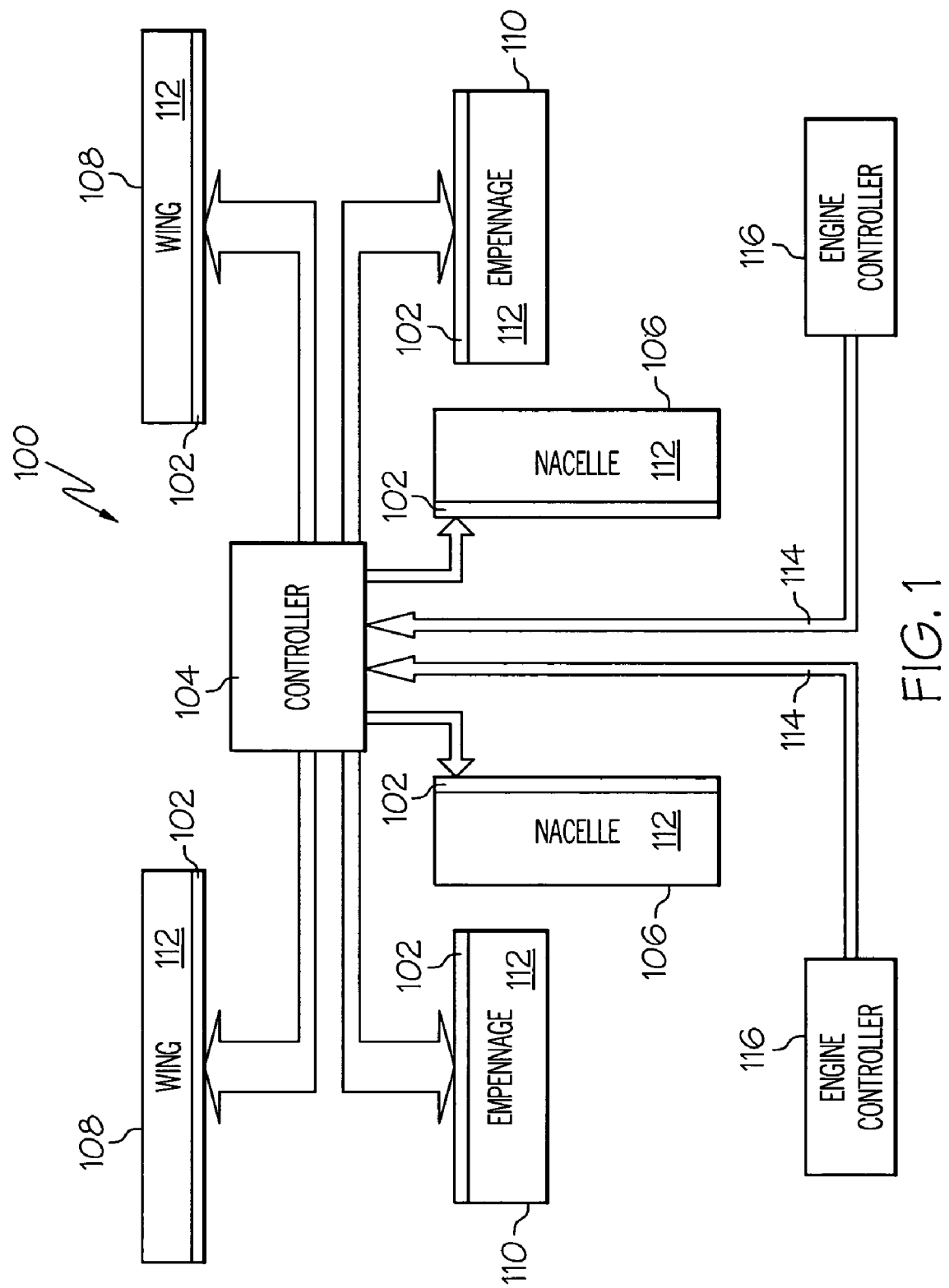
FIG. 1 is functional block diagram of an exemplary embodiment of a hybrid electrical ice protection system for an aircraft according to the present invention.

Turning now to the description and with reference first to FIG. 1, an exemplary embodiment of an hybrid ice protection system 100 is shown. The system 100 includes a plurality of electrical heaters 102 and a heater controller 104. The plurality of electrical heaters 102 are associated with, and used to heat portions of, various aircraft structures. For example, certain of the heaters 102 are used to heat portions of the engine nacelle 106, certain of the heaters 102 are used to heat portions of the aircraft wings 108, and certain of the heaters are used to heat portions of various aircraft empennages 110.

Figure 8:
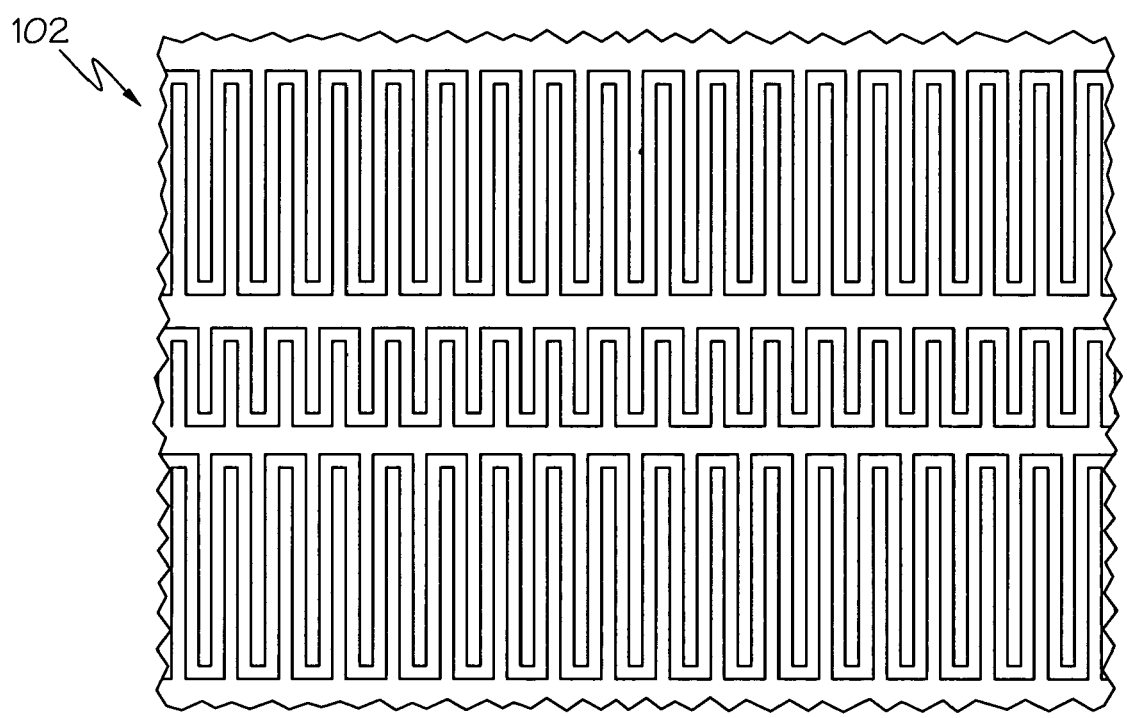
FIG. 8 illustrates a portion of a known electrical heater that may be used to form part of the system of FIG. 1.

Each of the various aircraft structures 106, 108, 110 includes an outer skin 112 on which ice may form and/or accumulate. The heaters 102 are disposed at least proximate the outer skin 112 on each of the aircraft structures 106, 108, 110 and, as will be described in more detail further below are divided into a plurality of heater sets. Preferably, the heaters 102 are disposed underneath the outer skin 112; however, it will be appreciated that the heaters 102 may alternatively be disposed external to the outer skin 112. No matter which aircraft structure the heaters 102 are associated with, nor the specific physical location of the heaters 102 relative to the outer skin 112, each heater 102 is an electro-thermal type heater that, upon energization, heats the outer skin 112 to a temperature that will either melt ice that has formed or accreted on the structure, or prevent ice formation thereon altogether. It will be appreciated that the temperature to which the heaters 102 heat the outer skin 112 will depend, at least in part, on the particular mode in which the heaters 102 are being operated, which is in turn determined by the heater controller 104. It will additionally be appreciated that the heaters 102 may be any one of numerous types of electro-thermal heaters now known or developed in the future. For completeness, an non-limiting example of just one embodiment of a portion of a presently known electro-thermal heater 102 is shown in FIG. 8.

Returning once again to FIG. 1, the heater controller 104 is coupled to each of the heaters 102 and is configured to selectively energize the heaters 102 in such a manner that the heaters 102 are operated in one or more of three modes—a fully-evaporative anti-ice mode, a wet running anti-ice mode, or a de-ice mode. As will be described in more detail further below, the modes in which the heaters 102 are operated depend on the electrical power generation capability, or "power condition," of the aircraft. In this regard, the heater controller 104 is adapted to receive one or more aircraft power condition signals 114, which are representative of the power condition of the aircraft. The heater controller 104, using the aircraft power condition signals 114, determines the present power condition of the aircraft and, in response, selectively energizes the heaters 102 to operate in one or more of the three modes. In the depicted embodiment, the heater controller 104 receives the aircraft power condition signals from one or more engine controllers 116, though it will be appreciated that the signals representative of power condition could come from any one of numerous other sources.

The purpose for switching the operational modes of the heaters 102 based on the aircraft power condition will be described in more detail further below. Before doing so, however, a description of how the heaters 102 are arranged on the engine nacelle 106, the aircraft wings 108, and the various other empennages 110 will first be provided.

Figure 2:
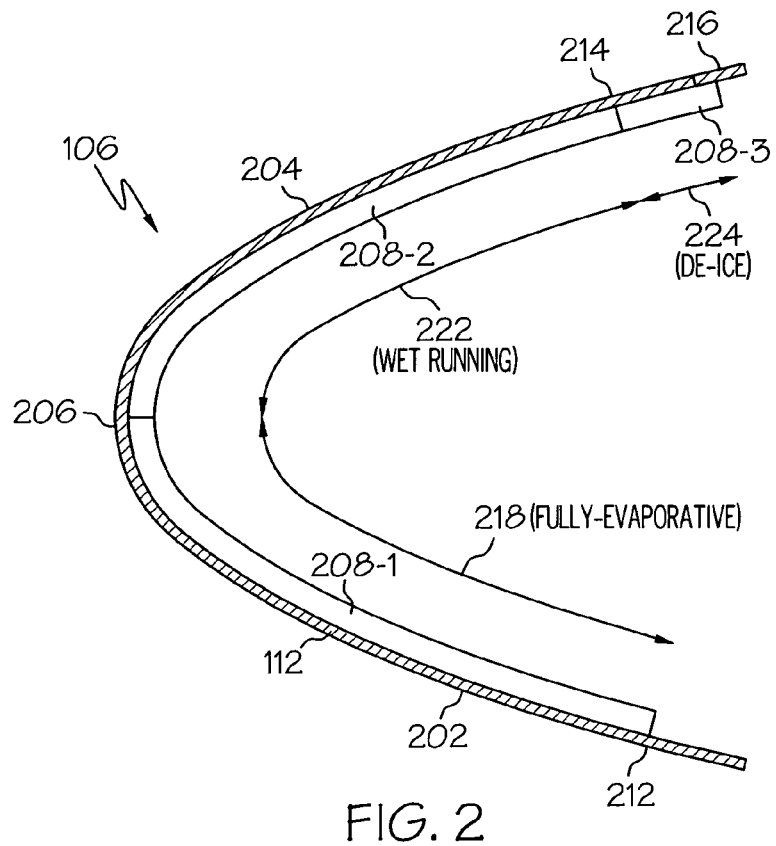
FIG. 2 is a simplified cross section view of a portion of an engine nacelle that may use the ice protection system of FIG. 1, illustrating the operational configuration of the system when the aircraft is configured in a nominal power condition.

Turning now to FIG. 2, a simplified cross section view of a portion of one of the engine nacelles 106 is shown. The engine nacelle 106 includes an inboard surface 202, an outboard surface 204, and a leading edge 206. The heaters 102 for the engine nacelle 106 are disposed proximate the nacelle outer skin 112, and are divided into three sets—a first set of nacelle heaters 208-1, a second set of nacelle heaters 208-2, and a third set of nacelle heaters 208-3. In the depicted embodiment, the first set of nacelle heaters 208-1 is positioned to heat, when energized, a portion of the nacelle inboard surface 202. More specifically, the first set of nacelle heaters 208-1, when energized, heats the nacelle inboard surface 202 between the nacelle leading edge 206 and a predetermined inboard position 212. Although the predetermined inboard position 212 may vary, it preferably corresponds to a position that is at least proximate the air impingement limit of the nacelle inboard surface 202.

The second 208-2 and third 208-3 sets of nacelle heaters are both positioned to heat, when energized, portions of the nacelle outboard surface 204. More specifically, the second set of nacelle heaters 208-2, when energized, heats the nacelle outboard surface 204 between the nacelle leading edge 206 and a first predetermined outboard position 214, and the third set of nacelle heaters 208-3, when energized, heats the nacelle outboard surface 204 between the first predetermined outboard position 214 and a second predetermined outboard position 216. As with the predetermined inboard position 212, the first 214 and second 216 predetermined outboard positions may vary. However, the first predetermined outboard position 214 preferably corresponds to a position that is at least proximate the air impingement limit of the nacelle outboard surface 204, and the second predetermined outboard position 216 corresponds to the location at which runback water could freeze.

Figure 3:
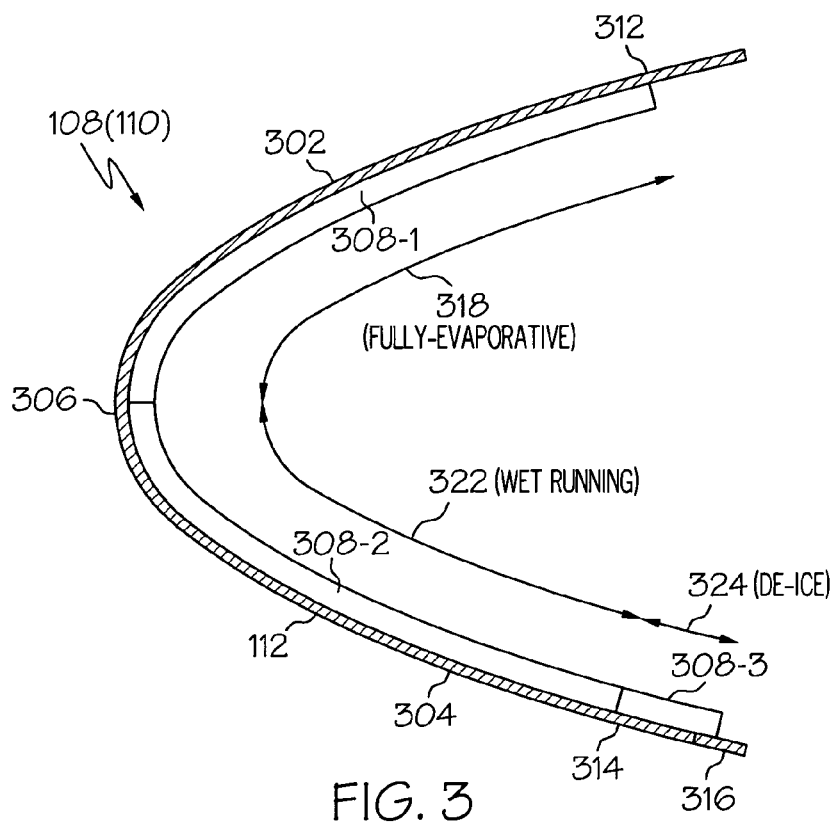
FIG. 3 is a simplified cross section view of a portion of an aircraft airfoil structure, such as a wing or empennage, that may use the ice protection system of FIG. 1, illustrating the operational configuration of the system when the aircraft is configured in a nominal power condition.

With reference now to FIG. 3, a simplified cross section view of a portion of one of the aircraft wings (or empennages) 108 (or 110) is shown. The depicted aircraft wing (empennage) 108 (110) includes an upper surface 302, a lower surface 304, and a leading edge 306. The heaters 102 for the aircraft wing (empennage) 108 (110) are disposed proximate the wing (empennage) outer skin 112 and, similar to the engine nacelle heaters 208, are divided into three sets—a first set of wing (empennage) heaters 308-1, a second set of wing (empennage) heaters 308-2, and a third set of wing (empennage) heaters 308-3. In the depicted embodiment, the first set of wing (empennage) heaters 308-1 is positioned to heat, when energized, a portion of the wing (empennage) upper surface 302. More specifically, the first set of wing (empennage) heaters 308-1, when energized, heats the wing (empennage) upper surface 302 between the wing (empennage) leading edge 306 and a predetermined upper position 312. Although the predetermined upper position 312 may vary, it preferably corresponds to a position that is at least proximate the air impingement limit of the wing (empennage) upper surface 302.

The second 308-2 and third 308-3 sets of wing (empennage) heaters are both positioned to heat, when energized, portions of the wing (empennage) lower surface 304. More specifically, the second set of wing (empennage) heaters 308-2, when energized, heats the wing (empennage) lower surface 304 between the wing (empennage) leading edge 306 and a first predetermined lower position 314, and the third set of wing (empennage) heaters 308-3, when energized, heats the wing (empennage) lower surface 304 between the first predetermined lower position 314 and a second predetermined lower position 316. As with the predetermined upper position 312, the first 314 and second 316 predetermined lower positions may vary. However, the first predetermined lower position 314 preferably corresponds to a position that is at least proximate the air impingement limit of the wing (empennage) lower surface 304, and the second predetermined lower position 316 corresponds to the location at which runback water could refreeze.

As was noted above, the heater controller 104 selectively operates the heaters 102 in one of three modes, depending on the aircraft power condition. Moreover, as will now be further described, the specific modes implemented depend on the specific aircraft structure 106, 108, 110 for which ice protection is being provided, and the portion of the aircraft structure 106, 108, 110 that is being heated.

More specifically, and with reference to FIGS. 1 and 2 in combination, when the aircraft is operating in a nominal power condition, each of the engine controllers 116 will supply aircraft power condition signals 114 to the heater controller 104 representative of this condition. In response, the heater controller 104 selectively energizes the first 208-1, second 208-2, and third 208-3 sets of nacelle heaters to operate in the fully-evaporative anti-ice mode, the wet running anti-ice mode, and the de-ice mode, respectively. Thus, during nominal power conditions the engine nacelles 106 each include three different ice protection zones—a fully-evaporative anti-ice zone 218, a wet running anti-ice zone 222, and a de-ice zone 224.

The nacelle fully-evaporative anti-ice zone 218, which extends from the nacelle leading edge 206 to the predetermined inboard position 212, prevents ice from being ingested into the engine (not shown). The nacelle wet running anti-ice zone 222, which extends from the nacelle leading edge 206 to the first predetermined outboard position 214, maintains sufficient aerodynamic smoothness of the nacelle outboard surface 204. The nacelle de-ice zone 224, which is downstream of the wet running anti-ice zone 222 and is disposed between the first 214 and second 216 predetermined outboard positions, sheds any runback water that may be re-frozen upon flowing way from the nacelle wet running zone 222.

Similarly, and with reference now to FIGS. 1 and 3 in combination, when the aircraft is operating in the nominal power condition, the heater controller 104 selectively energizes the first 308-1, second 308-2, and third 308-3 sets of wing (empennage) heaters to operate in the fully-evaporative anti-ice mode, the wet running anti-ice mode, and the de-ice mode, respectively. Thus, during nominal power conditions the wings (empennages) 108 (110) also include a fully-evaporative anti-ice zone 318, a wet running anti-ice zone 322, and a de-ice zone 324.

The wing (empennage) fully-evaporative anti-ice zone 318, which extends from the wing (empennage) leading edge 306 to the predetermined upper position 312, prevents ice from being formed on the wing (empennage) upper surface 302, to thereby maintain aerodynamic smoothness over the entire wing (empennage) upper surface 302. The wing (empennage) wet running anti-ice zone 322, which extends from the wing (empennage) leading edge 306 to the first predetermined lower position 314, maintains sufficient aerodynamic smoothness over a portion of the wing (empennage) lower surface 304. The wing (empennage) de-ice zone 324, which is downstream of the wing (empennage) wet running anti-ice zone 322 and is disposed between the first 314 and second 316 predetermined lower positions, sheds any runback water that may be re-frozen upon flowing out of the wing (empennage) wet running zone 322.

If, in the unlikely event the aircraft is operating in an off-nominal power condition, the amount of electrical power available for the various electrical loads on the aircraft will be reduced. In some instances, depending on the cause of the off-nominal power condition, the amount of electrical power may be significantly reduced. For example, in the highly unlikely event that one of the aircraft engines became inoperative during flight, the available electrical power would be significantly reduced. Depending on the environmental conditions, it may be necessary, or at least desirable, to continue operating the aircraft ice protection system 100, even during the off-nominal power condition. Thus, as will now be described, the heater controller 104 reconfigures the operational modes of each of some the heaters 102 when an off-nominal power condition occurs.

Figure 4:
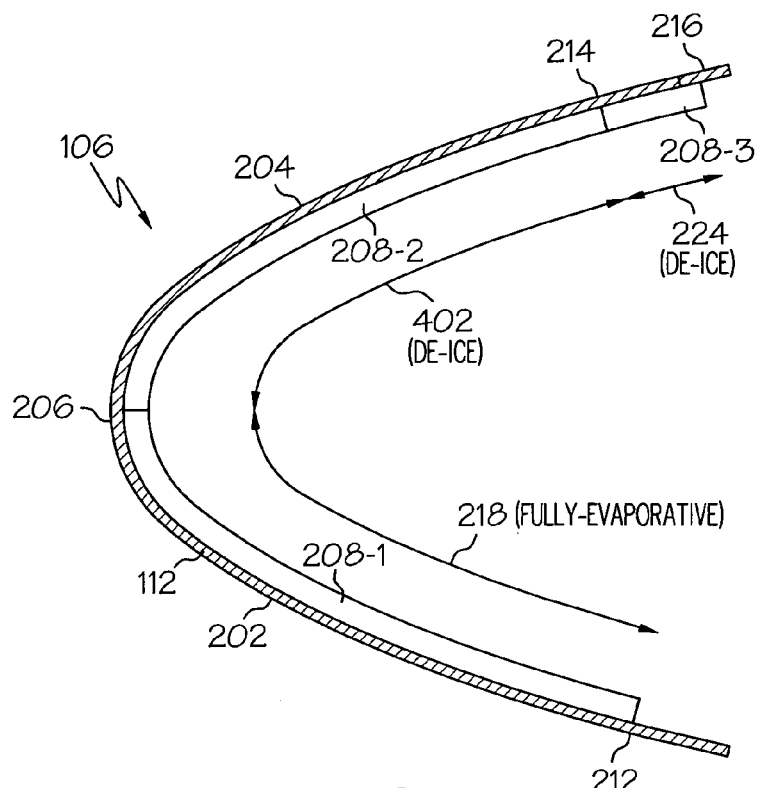
FIG. 4 is a simplified cross section view of the portion of the engine nacelle of FIG. 2, illustrating the operational configuration of the system when the aircraft is configured in an off-nominal power condition.
Figure 5:
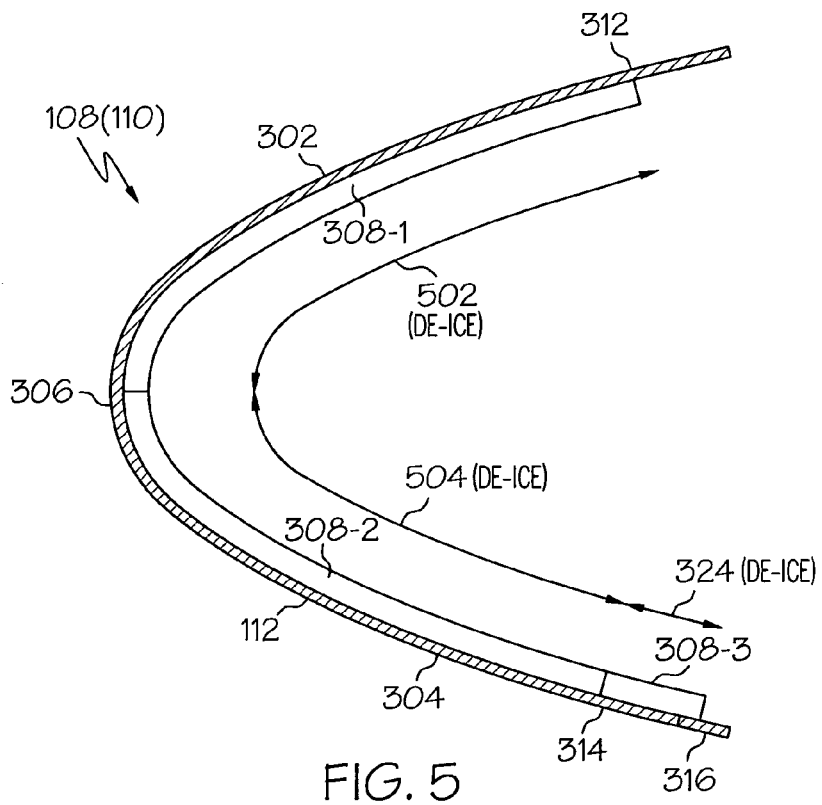
FIG. 5 is a simplified cross section view of the portion of the aircraft airfoil of FIG. 3, illustrating the operational configuration of the system when the aircraft is configured in an off-nominal power condition.

Referring now to FIGS. 1 and 4 in combination, it is seen that when the aircraft is operating in an off-nominal power condition, each of the engine controllers 116 will supply aircraft power condition signals 114 to the heater controller 104 representative of this condition. In response, the heater controller 104 continues to selectively energize the first set of nacelle heaters 208-1 to operate in the fully-evaporative anti-ice mode; however, the heater controller 104 selectively energizes the second 208-2 and third 208-3 sets of nacelle heaters such that both sets operate in the de-ice mode. Thus, during off-nominal power conditions the nacelle fully-evaporative anti-ice zone 218 and the de-ice zone 224 are unchanged, while the nacelle wet running anti-ice zone 222 is switched to a second nacelle de-ice zone 402. Moreover, as is shown in FIG. 5, the heater controller 104, during an off-nominal power condition, selectively energizes the first 308-1, second 308-2, and third 308-3 sets of wing (empennage) heaters in a manner that all three sets operate in the de-ice mode. Thus, while the wing (empennage) de-ice zone 324 is unchanged, the wing (empennage) fully-evaporative 318 and wet running 322 anti-ice zones are switched to second 502 and third 504 wing (empennage) de-ice zones.

Figure 6:
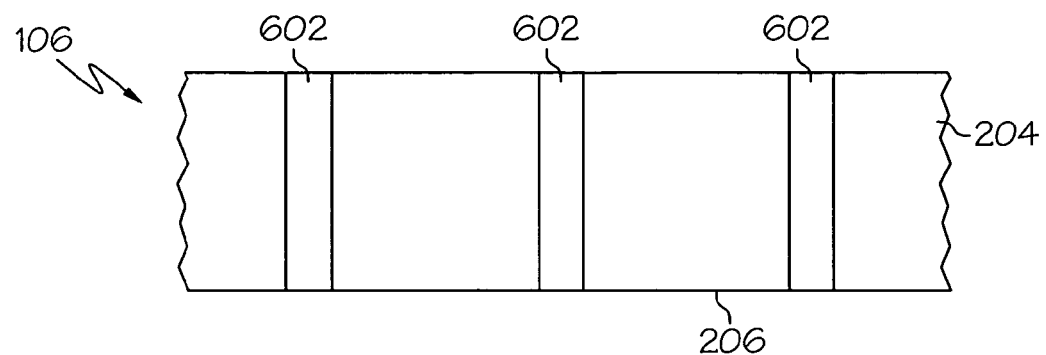
FIG. 6 is a view of an outboard surface of a portion of the engine nacelle of FIG. 1, showing the implementation of a portion of some heaters thereon when the system is configured as shown in FIG. 4.
Figure 7:
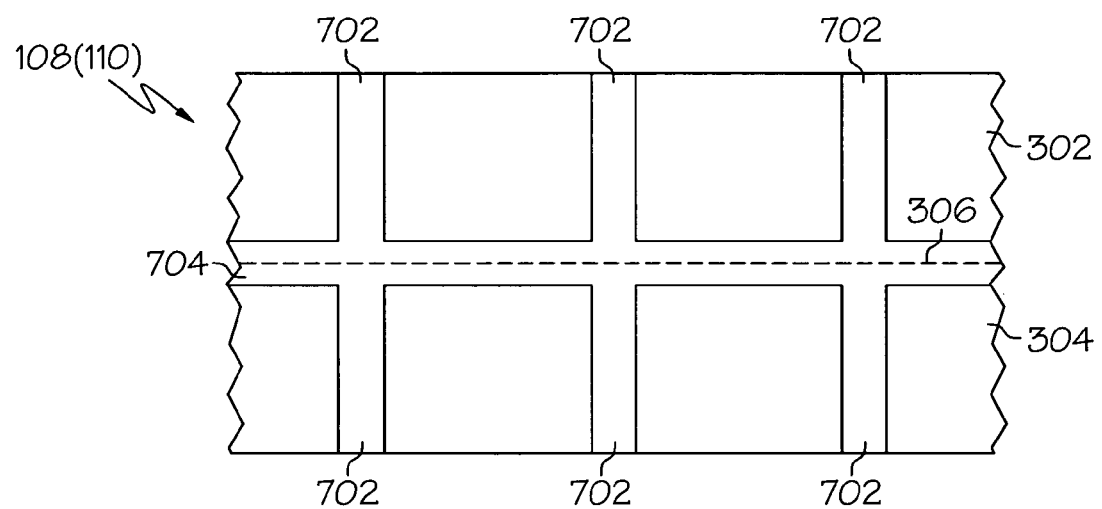
FIG. 7 is a simplified, flattened view of a portion of the aircraft airfoil of FIG. 2, showing portions of both the upper and lower surfaces thereof, and illustrating the implementation of a portion of some heaters thereon when the system is configured as shown in FIG. 5.

In addition to the above-described general changes in heater operational modes, the ice protection system 100 also preferably configured to implement a portion of the heaters 102 to function as additional parting strips during operation in the off-nominal power condition. In particular, and with reference to FIG. 6, when the second set of nacelle heaters 208-2 is energized to operate in the de-ice mode, some of the heaters are implemented as chordwise parting strips 602 to facilitate shedding. Additionally, as is shown more clearly in FIG. 7, when the first 308-1 and second 308-2 sets of wing (empennage) heaters are energized to operate in the de-ice mode, some of the heaters are implemented as chordwise parting strips 702 and some are implemented as spanwise parting strips 704, both of which also facilitate shedding.

The hybrid electrical ice protection system 100 implements three ice protection methods in various combinations. These ice protection methods include the fully-evaporative anti-ice protection method, the wet running anti-ice protection method, and the de-ice method. Moreover, the particular methods that are implemented vary, depending on the particular aircraft structure 106, 108, 110 for which ice protection is being provided and on the power condition of the aircraft. Implementing these three ice protection methods in combination provides significant energy savings as compared to implementing a single ice protection method on a particular structure 106, 108, 110. In addition, the hybrid electrical system 100 is reconfigured upon determining that the aircraft is in an off-nominal power condition. The energy savings are even further increased when the system is reconfigured 100.

As an example of the energy savings that may be realized by the hybrid electrical system 100, the energy requirements for an aircraft that uses hot engine bleed air to implement the fully-evaporative anti-ice method is compared to the energy requirements of the hybrid electrical system 100. The comparison is based on an aircraft having ice protected surface areas of 16 m$^2$ for the wing and empennages, and 13 m$^2$ for the engine nacelles. The hot engine bleed air system implementing the fully-evaporative anti-ice method on these structures would require about 831 kW of power. Conversely, the hybrid electrical system 100, during the nominal power condition, requires only 597 kW of power. Moreover, during the off-nominal power condition, the hybrid electrical system 100 requires only 151 kW of power. Thus, as compared to a conventional, fully-evaporative hot engine bleed air system, the hybrid electrical system 100 provides about a 28% power savings during nominal power conditions, and about an 81% power savings during off-nominal power conditions.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electrical ice protection system for an aircraft operable in at least a nominal power condition and an off-nominal power condition, and including a structure having at least an outer skin, the ice protection system comprising:
   a plurality of electrical heaters disposed at least proximate the aircraft structure outer skin and configured to heat at least a portion of the aircraft structure outer skin upon energization thereof, the plurality of electrical heaters including at least a first set of heaters and a second set of heaters; and
   a controller to determine whether the aircraft is in the nominal power condition or the off-nominal power condition, the controller coupled to each of the electrical heaters and in response to the determined power condition, to:
      selectively energize the first set of heaters in a manner that the first set of heaters are operated in a fully-evaporative anti-ice mode, and
      selectively energize the second set of heaters in a manner that the second set of heaters are operated in:
         (i) a wet running anti-ice mode, if the aircraft is in the nominal power condition, and
         (ii) a de-ice mode, if the aircraft is in the off-nominal power condition.

2. The system of claim 1, wherein:
   the plurality of electrical heaters further includes a third set of heaters; and
   the controller is further configured, in response to the determined power condition, to selectively energize the third set of heaters in a manner that the third set of heaters are operated in the de-ice mode.

3. The system of claim 1, wherein the controller is further configured, in response to the determined power condition, to selectively energize the first set of heaters in a manner that the first set of heaters are operated in:
   (i) the fully-evaporative anti-ice mode, if the aircraft is in the nominal power condition, and
   (ii) the de-ice mode, if the aircraft is in the off-nominal power condition.

4. The system of claim 1, wherein:
   the structure is an engine nacelle having at least an inboard surface and an adjacent outboard surface, the inboard and outboard surfaces each having the outer skin thereon;
   the first set of heaters are disposed proximate at least a section of the outer skin that is on the engine nacelle inboard surface; and
   the second set of heaters are disposed proximate at least a section of the outer skin that is the outer skin on at least a section of the engine nacelle outboard surface.

5. The system of claim 4, wherein:
   the plurality of electrical heaters further includes a third set of heaters; and
   the controller is further configured to selectively energize the third set of heaters in a manner that the third set of heaters is operated in the de-ice mode.

6. The system of claim 5, wherein the controller is configured to selectively energize the third set of heaters in a manner that the third set of heaters is operated in the de-ice mode whether the aircraft is in the nominal power condition or in the off-nominal power condition.

7. The system of claim 5, wherein:
   the engine nacelle further includes a leading edge disposed between the adjacent inboard and outboard surfaces;
   the third set of heaters are disposed proximate the outer skin on at least a section of the engine nacelle outboard surface; and
   the second set of heaters are disposed between the third set of heaters and the engine nacelle leading edge.

8. The system of claim 7, wherein the plurality of electrical heaters includes:
   a plurality of electrical heaters arranged chordwise relative to the engine nacelle; and
   a plurality of electrical heaters arranged spanwise relative to the engine nacelle.

9. The system of claim 8, wherein:
   selected ones of the plurality of chordwise-arrange electrical heaters are part of the second and third sets of heaters; and
   the controller, when configured to selectively energize the second and third sets of heaters in a manner that the second and third sets of heaters are operated in the de-ice mode, is further configured to selectively energize one or more of the chordwise-arranged electrical heaters as parting strips.

10. The system of claim 1, wherein:
the structure is an aircraft wing or empennage having at least an upper surface and an adjacent lower surface, the upper and lower surfaces each having the outer skin thereon;
the first set of heaters are disposed proximate the outer skin on at least a section of the structure upper surface; and
the second set of electrical heaters are disposed proximate the outer skin on at least a section of the structure second surface.

11. The system of claim 10, wherein:
the plurality of electrical heaters further includes a third set of heaters; and
the controller is further configured to selectively energize the third set of heaters in a manner that the third set of heaters is operated in the de-ice mode.

12. The system of claim 11, wherein the controller is configured to selectively energize the third set of heaters in a manner that the third set of heaters is operated in the de-ice mode whether the aircraft is in the nominal power condition or in the off-nominal power condition.

13. The system of claim 12, wherein the controller is further configured, in response to the determined power condition, to selectively energize the first set of heaters in a manner that the first set of heaters are operated in:
(i) the fully-evaporative anti-ice mode, if the aircraft is in the nominal power condition, and
(ii) the de-ice mode, if the aircraft is in the off-nominal power condition.

14. The system of claim 13, wherein:
the aircraft wing or empennage further includes a leading edge disposed between the adjacent upper and lower surfaces;
the third set of heaters are disposed proximate the outer skin on at least a section of the structure lower surface; and
the second set of heaters are disposed between the third set of heaters and the structure leading edge.

15. The system of claim 14, wherein the plurality of electrical heaters includes:
a plurality of electrical heaters arranged chordwise relative to the aircraft wing; and
a plurality of electrical heaters arranged spanwise relative to the aircraft wing.

16. The system of claim 15, wherein the controller, when configured to selectively energize the first, second, and third sets of heaters in a manner that the first, second, and third sets of heaters are operated in the de-ice mode, is further configured to selectively energize one or more of the spanwise-arranged electrical heaters and one or more of the chordwise-arranged electrical heaters as parting strips.

17. An electrical ice protection system for an aircraft operable in at least a nominal power condition and an off-nominal power condition, the aircraft including an engine nacelle having at least an inboard surface and an adjacent outboard surface, the inboard and outboard surfaces each including an outer skin, the ice protection system comprising:
a first set of electrical heaters disposed proximate the engine nacelle inboard surface outer skin, the first set of heaters configured, upon energization thereof, to heat at least a portion of the engine nacelle inboard surface outer skin;
a second set of electrical heaters disposed proximate the engine nacelle outboard surface outer skin, the second set of heaters configured, upon energization thereof, to heat at least a portion of the engine nacelle outboard surface outer skin; and
a controller to determine whether the aircraft is in the nominal power condition or the off-nominal power condition, the controller coupled to the first and second set of electrical heaters and in response to the determined power condition, to:
selectively energize the first set of electrical heaters in a manner that the first set of heaters are operated in a fully-evaporative anti-ice mode, and
selectively energize the second set of electrical heaters in a manner that the second set of electrical heaters are operated in:
(i) a wet running anti-ice mode, if the aircraft is in the nominal power condition, and
(ii) a de-ice mode, if the aircraft is in the off-nominal power condition.

18. The system of claim 17, further comprising:
a third set of electrical heaters disposed proximate the engine nacelle outboard surface outer skin,
wherein the controller is further configured, in response to the determined power condition, to selectively energize the third set of electrical heaters in a manner that the third set of electrical heaters are operated in the de-ice mode.

19. The system of claim 18, wherein the controller is configured to selectively energize the third set of electrical heaters in the manner that the third set of electrical heaters are operated in the de-ice mode whether the aircraft is in the nominal power condition or in the off-nominal power condition.

20. The system of claim 18, wherein:
the engine nacelle further includes a leading edge disposed between the inboard and outboard surfaces;
the third set of heaters are disposed proximate the outer skin on at least a section of the engine nacelle outboard surface; and
the second set of heaters are disposed between the third set of heaters and the engine nacelle leading edge.

21. The system of claim 20, wherein the plurality of electrical heaters includes:
a plurality of electrical heaters arranged chordwise relative to the engine nacelle; and
a plurality of electrical heaters arranged spanwise relative to the engine nacelle.

22. The system of claim 21, wherein:
selected ones of the plurality of chordwise-arranged electrical heaters are part of the second and third sets of heaters; and
the controller, when configured to selectively energize the second and third sets of heaters in a manner that the second and third sets of heaters are operated in the de-ice mode, is further configured to selectively energize one or more of the chordwise-arranged electrical heaters as parting strips.

23. An electrical ice protection system for an aircraft operable in at least a nominal power condition and an off-nominal power condition, the aircraft including a wing having at least an upper surface and a lower surface, the upper and lower surfaces each including an outer skin, the ice protection system comprising:
a first set of electrical heaters disposed proximate the wing upper surface outer skin, the first set of heaters configured, upon energization thereof, to heat at least a portion of the wing upper surface outer skin;

a second set of electrical heaters disposed proximate the wing lower surface outer skin, the second set of heaters configured, upon energization thereof, to heat at least a portion of the wing lower surface outer skin; and a controller to determine whether the aircraft is in the nominal power condition or the off-nominal power condition, the controller coupled to the first and second set of electrical heaters and in response to the determined power condition, to:

selectively energize the first set of electrical heaters in a manner that the first set of heaters are operated in a fully-evaporative anti-ice mode, and selectively energize the second set of electrical heaters in a manner that the second set of electrical heaters are operated in:
  (i) a wet running anti-ice mode, if the aircraft is in the nominal power condition, and
  (ii) a de-ice mode, if the aircraft is in the off-nominal power condition.

24. The system of claim 23, further comprising:
a third set of electrical heaters disposed proximate the wing lower surface outer skin,
wherein the controller is further configured, in response to the determined power condition, to selectively energize the third set of electrical heaters in a manner that the third set of electrical heaters are operated in the de-ice mode.

25. The system of claim 24, wherein the controller is configured to selectively energize the third set of electrical heaters in the manner that the third set of electrical heaters are operated in the de-ice mode whether the aircraft is in the nominal power condition or in the off-nominal power condition.

26. The system of claim 24, wherein:
the wing further includes a leading edge disposed between the upper and lower surfaces;
the third set of heaters are disposed proximate the outer skin on at least a section of the wing lower surface; and
the second set of heaters are disposed between the third set of heaters and the wing leading edge.

27. The system of claim 23, wherein the controller is further configured, in response to the determined power condition, to selectively energize the first set of electrical heaters in a manner that the first set of electrical heaters are operated in:
  (i) the fully-evaporative anti-ice mode, if the aircraft is in the nominal power condition, and
  (ii) the de-ice mode, if the aircraft is in the off-nominal power condition.

28. The system of claim 27, wherein the plurality of electrical heaters includes:
a plurality of electrical heaters arranged chordwise relative to the aircraft wing; and
a plurality of electrical heaters arranged spanwise relative to the aircraft wing.

29. The system of claim 28, wherein the controller, when configured to selectively energize the first, second, and third sets of heaters in a manner that the first, second, and third sets of heaters are operated in the de-ice mode, is further configured to selectively energize one or more of the spanwise-arranged electrical heaters and one or more of the chordwise-arranged electrical heaters as parting strips.

30. An electrical ice protection system for an aircraft operable in at least a nominal power condition and an off-nominal power condition, and including an engine nacelle and an aircraft wing, the engine nacelle having at least an inboard surface and an adjacent outboard surface, each with an outer skin, the aircraft wing including at least an upper surface and a lower surface, each with an outer skin, the ice protection system comprising:

a first set of electrical heaters disposed proximate the engine nacelle inboard surface outer skin, the first set of heaters configured, upon energization thereof, to heat at least a portion of the engine nacelle inboard surface outer skin;

a second set of electrical heaters disposed proximate the engine nacelle outboard surface outer skin, the second set of heaters configured, upon energization thereof, to heat at least a portion of the engine nacelle outboard surface outer skin;

a third set of electrical heaters disposed proximate the aircraft wing upper surface outer skin, the third set of electrical heaters configured, upon energization thereof, to heat at least a portion of the wing upper surface outer skin;

a fourth set of electrical heaters disposed proximate the aircraft wing lower surface outer skin, the fourth set of electrical heaters configured, upon energization thereof, to heat at least a portion of the wing lower surface outer skin; and a controller to determine whether the aircraft is in the nominal power condition or the off-nominal power condition, the controller coupled to the first, second, third, and fourth sets of electrical heaters and in response to the determined power condition, to:

selectively energize the first and third sets of electrical heaters in a manner that the first and third sets of electrical heaters are operated in a fully-evaporative anti-ice mode, and selectively energize the second and fourth sets of electrical heaters in a manner that the second and fourth sets of electrical heaters are operated in:
  (i) a wet running anti-ice mode, if the aircraft is in the nominal power condition, and
  (ii) a de-ice mode, if the aircraft is in the off-nominal power condition.

* * * * *